May 24, 1949.    L. E. W. MONTROSE-OSTER    2,471,075
ELECTRIC REMOTE SELECTIVE CONTROL SYSTEM
Filed Feb. 25, 1948
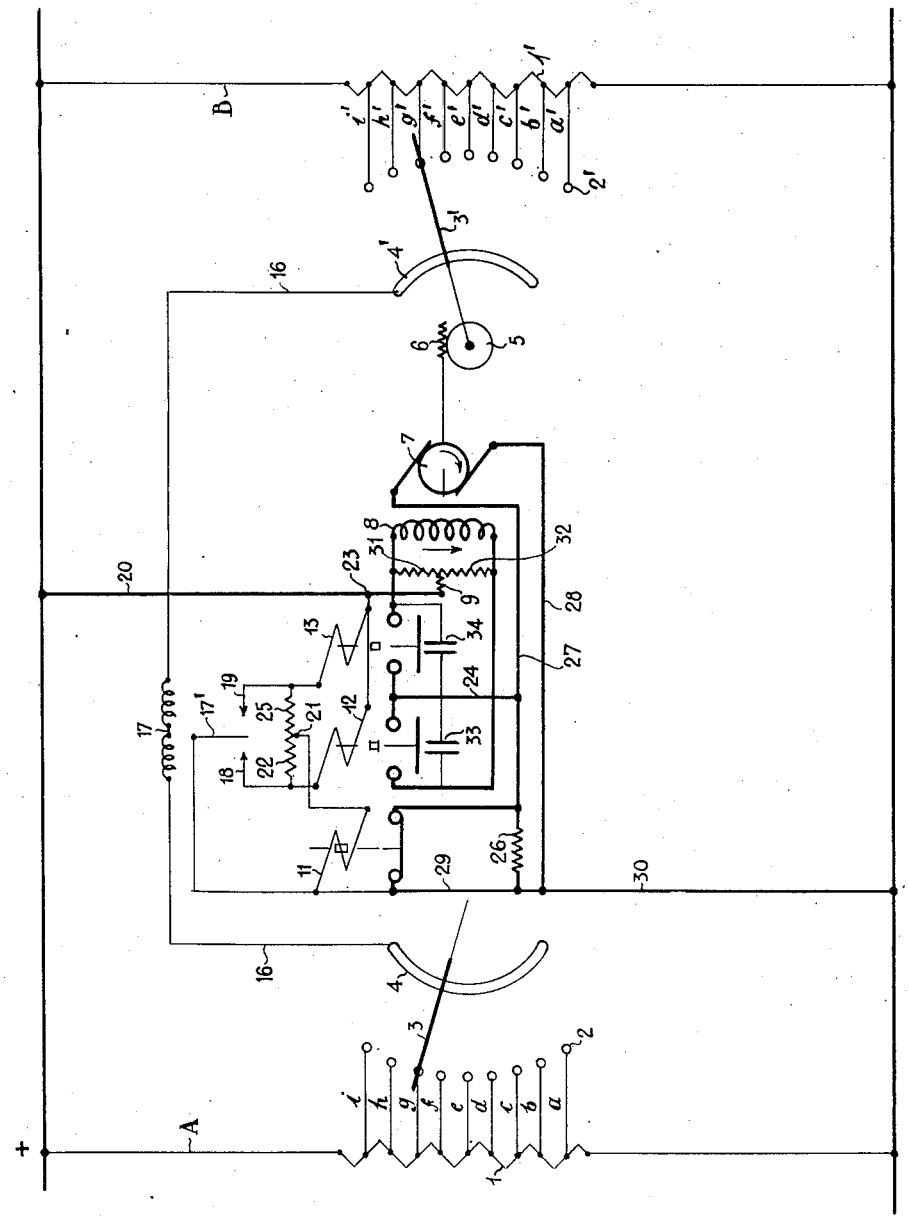
INVENTOR.
LOUIS E. W. MONTROSE-OSTER
BY
Blair, Curtis & Hayward.

Patented May 24, 1949

2,471,075

UNITED STATES PATENT OFFICE 2,471,075

ELECTRIC REMOTE SELECTIVE CONTROL SYSTEM

Louis Eugene Widolt Montrose-Oster, Brussels-Boitsfort, Belgium, assignor of one-half to Pollopas Patents Limited, London, England, a British company Application February 25, 1948, Serial No. 10,866
In Great Britain June 1, 1945

Section 1, Public Law 690, August 8, 1946
Patent expires June 1, 1965

2 Claims. (Cl. 318—29)

1

This invention relates to an electric remote selective control system with congruently sub-divided potentiometers at the transmitter and at the receiver, the tappings of which are connected to contact paths with a preferably resilient contact arrangement, and a compensating line arranged between the tappings which comprises a switching means for a controlling device of the driving motor at the receiver, and with short-circuiting means for the motor armature for consuming the kinetic energy of the moving parts of the receiver, which become effective as soon as the parts of the receiver have reached one of the positions predetermined on their contact path and respectively controlled by the transmitter, use being made of a plurality of different electromagnetic relays for controlling the driving motor of the receiver.

In my United States Patent No. 2,132,960, patented October 11, 1938, I have disclosed an electric remote selective control system of the kind above described, wherein different timing of the electromagnet relays is provided in such a manner that, on switching off the switching means in the compensating line, those relays which connect the driving motor to the mains voltage in series with a resistance open only after the short-circuiting relay of the motor armature has responded and short-circuited the armature of the driving motor.

In the arrangement described in my prior patent there are employed six electromagnetic relays, one for the short-circuiting of the armature and five for connecting the driving motor to the mains voltage, three of the latter being employed for causing the motor to rotate in one direction and three for causing the motor to rotate in the opposite direction (one relay being common to both circuits).

According to my present invention the circuit of the driving motor is closed by means of a single electromagnetic relay for each direction of rotation.

By the operation of one electromagnetic relay the driving motor is caused to rotate in one direction and by the operation of another electromagnetic relay the driving motor is caused to rotate in the opposite direction. Thus whereas in my prior arrangements three relays are employed for the running of the motor in each direction and a single relay for the short-circuiting of the motor armature, according to the present invention, only three electromagnetic relays are employed instead of the six described in my prior patent.

2

Preferably the circuit is so arranged that single-pole relays may be employed.

The driving motor preferably has only one non-subdivided field winding, and the field is strengthened simultaneously with the short-circuiting of the armature.

The accompanying drawing illustrates, as an example, a diagram of this new circuit for the particular case of feeding with direct current. It is shown in detail in order to make the invention particularly clear.

Referring to the drawing, 1 and 1' denote two identical potentiometers, one of which is installed at the transmitter A and the other at the receiver B. Each potentiometer is sub-divided into a number of steps $a$ to $i$ and $a'$ to $i'$ respectively, which are connected to a contact path 2 and 2' respectively arranged at A and B. The lever 3 can slide on the contact path arranged at A and the lever 3' on the contact path at B. Through these levers, the voltage derived is transmitted to the inner rings 4 and 4' respectively. The arrangement 1 to 4 therefore represents the transmitter and the arrangement 1' to 4' the receiver.

While the lever 3 can be adjusted, e. g., by hand, at will to one of the contacts $a$ to $i$ of the path 2, the contact lever 3' of the contact path 2' is moved, for instance, through a worm wheel 5 and a worm 6 from an electric motor, the armature and field winding of which are denoted by 7 and 8 respectively. A series-wound motor has been chosen for the example.

Parallel to the field winding 8 are connected two resistances in series, 31 and 32. Their central point is connected in series with a resistance 9 and by a lead 20 to the positive pole of the mains supply. Parallel to the armature are connected a resistance 26 and the contact of a relay 11 by means of the leads 27, 28 and 29. From the leads 28 and 29 a lead 30 carries the current to the negative pole. Parallel to the field winding 8 and the resistances 31 and 32 are connected the contacts of the relays 12 and 13 in series, and parallel to each pair of their contacts are condensers 33 and 34. The bridge between these two relays 12 and 13 is connected to the lead 27 by means of a lead 24.

In the compensating line 16 between the contact path 4 of the movable contact 3 of the transmitter and the contact path 4' of the movable contact 3' of the receiver, a polarised change-over relay 17 of well-known type is provided which makes contact by its movable tongue 17' either at 18 or 19, according to the direction of the current flowing in the compensating line 16. The circuit connection of the three relays 11, 12 and 13 is provided in the following manner: The current flowing from the positive conductor through the lead 20 is divided at 23, passes through the parallel coils of the relays 12 and 13 and the parallel resistances 22 and 25 and rejoins at 21. The whole current passes through the coil of relay 11 and reaches the negative conductor by means of leads 29 and 30. The outer extremities of the resistances 22 and 25 are connected to the contacts 18 and 19 of the polarised changeover relay 17, the movable tongue of which is connected to the negative conductor by leads 29 and 30.

In the condition shown (condition of rest), therefore, only the relay 11 has attracted its armature, whereby the armature 7 of the control motor is short-circuited. No current flows in the connecting line 16 between the members 4 and 4', since they are connected through the contact levers 3 and 3' to the equipotential points $g$ and $g'$ of the potentiometers 1 and 1'. If the lever 3 is displaced, for instance, on to the contact $c$, a potential gradient immediately arises from $g'$ to $c$, that is, at the terminals of the polarised relay 17 a voltage arises which causes this relay to make contact, e. g., at 18. Thereby the coil of the relay 11 and the series resistance 22 are short-circuited, so that the mains voltage now flows from the positive conductor through the supply lead 20, the junction 23, the coil of relay 12, the contact 18, the movable tongue 17', the leads 29 and 30 to the negative conductor. The current has now increased to such an extent that the relay 12 attracts its armature. Therefore at the moment when the polarized relay has established contact at 18, the relay 12 closes the circuit of the control motor before the short-circuiting of the armature 7 of the control motor is removed by the dropping-off of the armature of the short-circuiting relay 11. A current now flows from the positive conductor through the lead 20, the resistance 9 and divides in two parallel, unequal branches, one of which consists of the resistance 31 and the field winding 8, the other of the resistance 32, the current flowing through the field coil 8 in the direction shown by the arrow. The current passes through the closed contacts of relay 12 and the lead 24 to the lead 27, where it divides once more in two parallel branches, one being the motor armature 7, the other the parallel resistance 26, and rejoins in the lead 29 and flows through the lead 30 to the negative conductor. The motor starts running, for instance, in the direction of the arrow. In this case, it moves the lever 3' downwards through the gear 5, 6 until this lever has reached the contact $c'$. At this moment, the motor instantaneously stops. $c$ and $c'$ represent equipotential points, that is, the compensating current in the line 16 ceases to flow, the polarised relay 17 breaks the contact at 18, and before the relay 12 drops its armature, the differently timed relay 11 has already attracted its armature and short-circuited the armature 7 of the motor. Thereby, the motor instantaneously stops, since this short-circuit has taken place not only with a normally excited field, but even with an over-excited field. By the short-circuiting of the armature 7, the resistance of the motor circuit has been reduced, which results in a correspondingly greater current intensity in the motor circuit and, therefore, in the field winding 8.

Experiments have shown that the control motor in this circuit stops dead in a fraction of a revolution, even if its normal speed is above 1000 revolutions.

The lever 3' also follows the lever 3 in the same way if the latter is displaced upwards. In this case, the current in the connecting line 16 flows from 4 to 4', the polarised relay 17 responding in such a manner that contact is established at 19. Thereby, the short-circuiting relay 11 opens, as before, the bridge across the control motor armature 7. However, since the series resistance 25 is bridged-over this time, the relay 13 responds in attracting its armature, that is, the current in the field winding 8 flows this time in the opposite direction to that indicated by the arrow, so that the servo-motor runs in the opposite direction to its previous direction, that is, against the direction of the arrow, whereby the contact lever 3' is moved upwards.

It is thus possible from the station A to allow the switching lever 3' at the station B to assume at will a considerable number of different positions, provided that a corresponding equal number of positions and, therefore, tappings of the potentiometer is also provided at A. If the control relays are constructed in the manner indicated, not only an almost simultaneous movement of the levers 3 and 3' takes place, but it is also positively ensured that the lever 3' of the receiver will stop with almost mathematical accuracy at the predetermined position. Any inaccuracy in the adjustment of the contact lever 3' at the receiver end, i. e., the controlled post, is therefore removed in a simple manner by the employment of a normal motor and only three relays. This simplification is very important when the system is applied to controlling a number of posts from one control post.

It will be observed that the motor runs in both directions by means of two single-pole relays only, whereas normally direct-current motors, whether shunt or series wound, and even each alternating current commutator motor, require at least one bi-polar changeover switch if they have to run in both directions. By the arrangement according to this invention the same result is obtained with two single-pole relays only, corresponding to one single-pole changeover switch.

Instead of the selector lever 3, any other well-known selector arrangement, for instance, with contact buttons or plugs, slide-rails, rollers, drums or the like, may be employed. It is only necessary that the voltage division at the transmitter corresponds to that at the receiver.

Instead of the contact paths with a certain number of steps it is equally possible to employ other known contact systems without steps, giving a nearly infinitely variable control.

The drawing illustrates, for better understanding only the simplest construction of the potentiometers and contact paths. Of course, it is advisable to choose contact paths with resilient contact movements.

I claim:

1. An electric remote selective control system comprising two electrically similar potentiometers with movable selectors positioned at the controlling and controlled ends respectively of the system, a control motor having a field winding and an armature, for controlling the movement of the selector of the potentiometer at the controlled end of the system, a circuit for said motor including two resistances in series, of which one resistance is connected in parallel with said field winding and has a midpoint connection to one pole of a current supply source, and the other resistance is connected in parallel with said armature and is connected at one end to the other pole of said source, two single-pole relays each for controlling the opening and closing of both the field and armature circuits of said motor, one of said relays having an off position and a circuit-closing position connecting the other end of said second-mentioned resistance to one end of said first-mentioned resistance for causing rotation of said motor in one direction, and the other of said relays having an off position and a circuit-closing position connecting said other end of said second-mentioned resistance to the other end of said first-mentioned resistance for causing rotation of said motor in the opposite direction, and a third single-pole relay connected in parallel with said armature for controlling short-circuiting of said armature, a compensating circuit connecting said selectors of said potentiometers, said compensating circuit controlling all three of said relays and being responsive to establishment of a potential difference between said selectors caused by movement of the selector at the controlling end of the system, for selectively operating one or the other of said two first-mentioned relays according to the direction of current flow in said compensating circuit, whereby the field and armature circuits of said motor are closed by the operative one of said two first-mentioned relays to effect, in response to the movement of the selector at the controlling end of the system, a rotation of said motor and movement of the selector controlled thereby in the direction and to the extent necessary to establish an equipotential condition between selectors, said third relay being timed differently from said two first-mentioned relays whereby establishment of such equipotential condition causes said third relay to short-circuit said armature before the operative one of said two first-mentioned relays opens the field and armature circuits to interrupt current supply from said source to said armature, said field winding and said resistances, whereby to effect a rapid stoppage of said motor responsive to establishment of such equipotential condition.

2. An electric remote selective control system comprising two electrically similar potentiometers with movable selectors positioned at the controlling and controlled ends respectively of the system, a control motor having a single non-subdivided field winding and an armature, for controlling the movement of the selector of the potentiometer at the controlled end of the system, a circuit for said motor including two resistances in series, of which one resistance is connected in parallel with said field winding and has a midpoint connection to one pole of a current supply source, and the other resistance is connected in parallel with said armature and is connected at one end to the other pole of said source, two single-pole relays each for controlling the opening and closing of both the field and armature circuits of said motor, one of said relays having an off position and an operative, circuit-closing position connecting the other end of said second-mentioned resistance to one end of said first-mentioned resistance for causing rotation of said motor in one direction, and the other of said relays having an off position and an operative, circuit-closing position connecting said other end of said second-mentioned resistance to the other end of said first-mentioned resistance for causing rotation of said motor in the opposite direction, and a third single-pole relay connected in parallel with said armature for controlling short-circuiting of said armature, a compensating circuit connecting said selectors of said potentiometers, said compensating circuit controlling all three of said relays and being responsive to establishment of a potential difference between said selectors caused by movement of the selector at the controlling end of the system, for selectively operating one or the other of said two first-mentioned relays according to the direction of current flow in said compensating circuit, whereby the field and armature circuits of said motor are closed by the operative one of said two first-mentioned relays to effect, in response to the movement of the selector at the controlling end of the system, a rotation of said motor and movement of the selector controlled thereby in the direction and to the extent necessary to establish an equipotential condition between said selectors, said third relay being timed differently from said two first-mentioned relays whereby establishment of such equipotential condition causes said third relay to short-circuit said armature before the operative one of said two first-mentioned relays opens the field and armature circuits, whereby the kinetic energy of the moving parts of said motor is rapidly absorbed by the short-circuiting of said armature occurring while the field circuit is still closed and the field of the motor is simultaneously reinforced in consequence of said short-circuiting, to effect a rapid stoppage of said motor responsive to establishment of such equipotential condition.

LOUIS EUGENE WIDOLT
MONTROSE-OSTER.

REFERENCES CITED

The following references are of record in the file of this patent:

UNITED STATES PATENTS

| Number | Name | Date |
|---|---|---|
| 1,070,647 | Whittingham | Aug. 19, 1913 |
| 2,132,960 | Montrose-Oster | Oct. 11, 1938 |

FOREIGN PATENTS

| Number | Country | Date |
|---|---|---|
| 246,328 | Great Britain | Jan. 28, 1926 |